United States Patent [19]

Skorjanec et al.

[11] Patent Number: 4,803,130
[45] Date of Patent: Feb. 7, 1989

[54] REACTIVE SPUTTERING PROCESS FOR RECORDING MEDIA

[75] Inventors: Joseph Skorjanec, White Bear Lake; Carmen D. Moe, North St. Paul, both of Minn.

[73] Assignee: Minnesota Mining and Manufacturing Company, St. Paul, Minn.

[21] Appl. No.: 87,260

[22] Filed: Aug. 20, 1987

Related U.S. Application Data

[62] Division of Ser. No. 684,735, Dec. 21, 1984, Pat. No. 4,729,924.

[51] Int. Cl.$^4$ ............................................. G11B 5/64
[52] U.S. Cl. ................................ 204/192.2; 427/131; 427/132; 428/336; 428/694; 428/695; 428/900
[58] Field of Search ............... 428/695, 694, 900, 422, 428/421, 611, 678, 928, 336; 427/132, 131; 204/192.2, 192.14, 192.22

[56] References Cited

U.S. PATENT DOCUMENTS

| 3,531,322 | 9/1970 | Kefalas et al. | 117/236 |
| 4,069,360 | 1/1978 | Yanagisawa et al. | 428/64 |
| 4,124,736 | 11/1978 | Patel et al. | 428/622 |
| 4,210,946 | 7/1980 | Iwasaki et al. | 360/131 |
| 4,239,835 | 12/1980 | Iijima et al. | 428/611 |
| 4,267,238 | 5/1981 | Chernega | 428/422 |
| 4,268,556 | 5/1981 | Pedrotty | 428/65 |
| 4,327,139 | 4/1982 | Schaefer et al. | 428/65 |
| 4,333,985 | 6/1982 | Shirahata et al. | 428/336 |
| 4,404,247 | 9/1983 | Dominquez-Burquette et al. | 428/213 |
| 4,419,404 | 12/1983 | Arai et al. | 428/336 |
| 4,495,242 | 1/1985 | Arai et al. | 428/336 |
| 4,521,482 | 6/1985 | Arai et al. | 428/336 |
| 4,526,833 | 7/1985 | Burquette et al. | 428/336 |
| 4,536,444 | 8/1985 | Sumiya et al. | 428/340 |
| 4,554,217 | 11/1985 | Grimm et al. | 428/469 |
| 4,565,734 | 1/1986 | Arai et al. | 428/216 |
| 4,581,245 | 4/1986 | Nakamura et al. | 427/40 |
| 4,596,735 | 6/1986 | Noguchi et al. | 428/215 |

FOREIGN PATENT DOCUMENTS

| 57-158033 | 9/1982 | Japan . |
| 57-176537 | 10/1982 | Japan . |
| 58-133628 | 8/1983 | Japan . |
| 58-133627 | 8/1983 | Japan . |
| 58-130439 | 8/1983 | Japan . |
| 58-130438 | 8/1983 | Japan . |

Primary Examiner—Paul J. Thibodeau
Attorney, Agent, or Firm—Donald M. Sell; Douglas B. Little

[57] ABSTRACT

A method of mixing ferromagnetic recording media comprising the steps of:
(i) coating a non-magnetic substrate material with a magnetic layer comprising Co-Cr by sputtering;
(ii) after sufficient thickness built-up, introducing a gas (hydrocarbon, $N_2$, $NH_3$, or $O_2$) into sputtering process to deposit a layer of Co and Cr reaction products under the following conditions:
  (a) film growth at least 50 Angstroms per minute; and
  (b) fully reacting Co and Cr wtih gas introduced;
(iii) coating reactively sputtered layer with lubricant. Reactively sputtered layer promotes improved adhesion of lubricant to recording media.

3 Claims, No Drawings

REACTIVE SPUTTERING PROCESS FOR RECORDING MEDIA

This is a division of application Ser. No. 684,735, filed Dec. 21, 1984, now U.S. Pat. No. 4,729,924.

TECHNICAL FIELD

This invention relates to thin film magnetic recording media useful in the fields of data, audio and video recording. This invention especially concerns means for protecting such metallic thin film magnetic media from corrosion and wear due to contact with transducer heads on recording and playback apparatus.

BACKGROUND ART

Spurred by an increasing demand for higher density information storage, there has been an expanded effort to develop improved, high-density magnetic recording media. As a result, considerable attention has been focused on metallic, thin-film magnetic recording media which are capable of higher recording densities than pigment/binder media. Metallic thin film media may be used in perpendicular recording when they have an easy axis of magnetization perpendicular to the surface of the recording layer (see U.S. Pat. No. 4,210,946).

A problem common with known metallic, thin-film magnetic recording media resides in their susceptibility to wear and abrasion. Transducer heads contacting the metallic thin film will have a tendency to erode or otherwise damage it. Even slight erosion will result in considerable loss of data when high bit density recording is employed. Applications involving erosion and severe wear of metallic thin film media are on the increase, with video tape and electronic cameras being two examples.

The thin film media of U.S. Pat. No. 4,210,946 is a cobalt/chrome alloy. However, the surface of cobalt/chrome can be hard and abrasive and can scratch the surface of a recording/playback head causing the failure of both the medium and the head.

Organic protective topcoats or lubricants for thin film ferromagnetic media have been investigated for achieving satisfactory protection of the media. Such coatings include waxes of the fatty acid ester type (e.g. carnauba wax.) Other lubricants known in the magnetic recording media art are silicones, liquid paraffins, straight chain fatty acids such as myristic acid, palmitic acid and stearic acid. The disadvantages of some such protective topcoats include a build-up of a lubricant material on the transducer during the record/playback process, leading to a deterioration in performance and possibly clogging of the recording or playback transducer.

It is the object of this invention to improve the durability of thin metal film magnetic media through a surface modification of such media.

DISCLOSURE OF INVENTION

The above object has been realized by the introduction of a protective layer comprising a modification of the thin metal film itself which promotes adhesion of organic lubricants to the surface of the recording medium resulting in a significantly increased lifetime for the transducer head and recording medium.

The invention is summarized as a ferromagnetic recording medium comprising:

(A) a non-magnetic substrate;

(B) a magnetic layer on said substrate comprising a cobalt/chromium alloy;

(C) a bonding layer on the magnetic layer of part (B) comprising reaction products of cobalt and chromium selected from the group consisting of oxides, nitrides and carbides of cobalt and chromium or combinations of such oxides, carbides and nitrides, said bonding layer being characterized by a substantial absence of metallic cobalt and chromium; and (D) a lubricant layer on the bonding layer of part (C).

It has been found that the species of the oxide layer are crystalline in nature. When cobalt oxide is present, substantially all of it has been $Co_3O_4$ crystalline oxide of the spinel structure.

Most of the discussion subsequent hereto will deal with bonding layers which are oxides of chromium and cobalt; however, the statements made with regard to the oxides will be equally applicable to carbides and nitrides unless otherwise noted.

The bonding layer changes the surface of the recording medium to a fully oxidized (nitrided or carburized) surface that bonds more consistently and completely to the lubricant preventing it from being readily removed. Reactively sputtered oxygen treatment of the metallic medium surface provides this layer.

The inventive recording medium may have other layers besides those mentioned above. For example, there may be a layer of low coercive force (i.e. lower than the layer of part B) magnetic material (e.g. nickel-iron-molybdenum alloy) interposed between the magnetic recording layer (B) and the non-magnetic substrate (A). This low coercive force layer may be formed by sputtering an appropriate alloy onto the substrate. This typ of medium is described in U.S. Pat. No. 4,210,946, and the low coercive force layer is described as one having a coercive force no greater than one-fifth the coercive force of the cobalt/chromium alloy of part (B), such as an alloy of iron, nickel and molybdenum. Consequently, the magnetic layer need not be in direct contact with the substrate.

The article disclosed exhibits consistent and superior wear resistance, and record/playback characteristics are not degraded. These improved thin film magnetic recording media exhibit very good signal-to-noise ratios at very high recording densities.

DETAILED DESCRIPTION

The substrate of the inventive ferromagnetic recording medium may be any non-magnetic material which can be fabricated in a convenient form for use as a recording medium. The substrate may comprise a support in the form of a thin flexible web of polymeric material such as biaxially oriented polyester, polyimide, polycarbonate, polyether imide, polyether sulfone, polysulfone, or polypropyleneoxide. Polyimides seem to give a particularly smooth surface. Alternatively, the substrate may be of a non-magnetic metal or metal alloy such as aluminum, copper, brass, or beryllium-copper alloy. It may also be made of glass, silicon, or ceramic.

The thickness of the substrate may be similar to those used in such applications as rigid disks, floppy disks and tapes. It may also be a rigid plate or sheet. In one embodiment of the present invention, the substrate is flexible, biaxially oriented polyethylene terephthalate film of about 25 to 125 micrometers in thickness.

The atomic ratio of cobalt to chromium in the magnetic layer ranges generally from about 75/25 to 90/10, 84/16 being typical. Other elements (e.g. tantalum) may be alloyed with the cobalt and chromium, provided that they do not interfere with the magnetic properties of the medium. Thickness of the magnetic layer typically ranges from about 200 to 10,000 angstroms. In one embodiment of the present invention, the magnetic layer comprises columnar crystals of CoCr having their hexagonal close-packed c-axes parallel to the crystal growth direction. The columnar crystals may be oriented at an angle substantially less than 90° relative to the vertical or substantially normal to the substrate surface. In the latter instance, the easy axis of magnetization is likewise normal to the substrate surface, and such media provide means for high density recording, by supporting perpendicular magnetization.

The bonding layer has a thickness usually between about 40 and 300 angstroms, preferably between about 40 and 150 angstroms. Bonding layers which are too thick may result in spacing loss. Spacing loss is a loss in output signal which occurs when any coating is placed between the transducer or recording head and the magnetic layer of a recording medium. The grain size of an oxide bonding layer of this invention has been determined to be about 30 angstroms (Å).

The magnetic layer may be prepared by a variety of techniques such as electroplating, vacuum vapor deposition, sputtering, and ion plating. Vacuum deposition is generally used in the generation of longitudinal thin film magnetic media as a function of rapid deposition rates; while sputtering techniques are more applicable to providing perpendicular thin film magnetic media. Generally, erpendicular quality media are those with good crystallinity ($\Delta\theta_{50} < 16°$) and a perpendicular coercivity of about 300 to 1500 Oersteds.

In the cathodic sputtering process argon gas ions bombard the solid alloy target cathode in the sputtering chamber dislodging metal atoms by transferring the momentum of the accelerated ions to the metal atoms near the surface of the target. The substrate is placed at the anode, and the metal alloy atoms (CoCr) traverse the space between the anode and cathode to deposit or condense on the substrate. In the practice of the present invention, known sputtering techniques are utilized to generate the magnetic layer.

At a time near the completion of the formation of the cobalt chromium (ferromagnetic) layer, a controlled quantity of an appropriate gas is introduced, by known means, into the sputtering chamber. For example, oxygen gas of a high purity is introduced into the sputtering chamber during about the final three minutes of deposition with the pressure in the sputtering chamber increased from about 6 to about 12 millitorr. During this part of the sputtering process for growing the bonding layer, the sputtering gas need not be primarily argon. It could be pure oxygen, for example. Reactive oxygen ions are accelerated to the target region where they combine with the ferromagnetic layer, thus forming the bonding layer. In order to carburize the surface, one may substitute a hydrocarbon such as methane or acetylene gas for oxygen in the process described above. To make a nitride bonding layer, one would substitute a source of nitrogen such as $N_2$ or ammonia instead. It is also feasible to introduce oxygen, a carbon source and a nitrogen source at the same time into the sputtering apparatus to form oxides carbides and nitrides simultaneously.

The deposition of the bonding layer by sputtering need not necessariy be done as a stage in the process immediately after sputtering on the ferromagnetic layer nor in the same sputtering apparatus used to deposit that layer. It is possible to deposit the oxide, nitride or carbide of the bonding layer in a separate apparatus as a separate process step and some time after the ferromagnetic layer has been formed.

Although it is recognized that the surface of most metal films is subject to natural oxidation as a result of atmospheric exposure, such means do not provide for a uniform, homogeneous distribution of metal oxides. The reaction products of cobalt and chromium (e.g. oxides) constitute bonding sites for the lubricant of the lubricant layer, and points on the surface which are left unoxidized or unreacted become points where the lubricant will not bond effectively. X-Ray Photoelectron spectroscopy (XPS) analysis has shown that all the metal species on the surface of the inventive media have become reaction products (e.g., oxides); whereas, control samples of cobalt/chrome media without the bonding layer of this invention have shown that a significant proportion of the the surface is not oxidized.

There are several types of sputtering processes: direct current sputtering, magnetron sputtering, triode sputtering and radio frequency ($R_f$) sputtering. It is believed that any of these types of sputtering processes may be used in manufacturing the recording media of this invention. It is preferred to cool the cathode target by circulating water through the mounting plate.

It has been found that sputtering the cobalt chrome alloy can induce curl in the polymeric substrates onto which it is sputtered. In order to alleviate this problem, both sides of the substrate can be coated so that the curl effect on either side of the substrate cancels that of the other.

Obtaining the desired bonding layer is dependent upon the film growth rate during the reactive sputtering stage. For example, protective layers which are sputtered at a film growth rate of about 25Å/min do not give the beneficial results sought by this invention; whereas, film growth rates of 50Å/min or more do give such results (e.g. improved durability and lubricant bonding).

The type of lubricant or topcoat (part D of the invention) is not critical, and most organic lubricants used for metallic thin film recording media are suitable. Representative examples of useful lubricants are myristic acid and the low surface energy coverings described in U.S. Pat. No. 4,404,247 (see columns 3-7). In general, the patent referred to discloses a protective covering comprising an inner layer or primer and an outer layer of perfluoropolyether monomer segments. The materials of the inner and outer layers, following coating onto the medium, are subsequently in-situ polymerized, bonding the perfluoropolyether lubricant to the recording medium through the inner layer. The oxide or carbide sites in the protective layer of this invention provide excellent bonding sites for this type of lubricant.

Suitable perfluoropolyether monomers for the above-described lubricants preferably have the formula

$$Q(R_f)_k C_a F_{2a}\text{-}Z \qquad (A)$$

wherein Q comprises a polymerizable group attached to Rf, which represents a plurality of randomly distributed perfluoroalkylene oxide repeating units which may be branched or straight chain structures represented by the formula ($C_a F_{2a} O$) in which a of each unit is independently an integer of 1 to 4, k is the number of such units having a value of from 1 to 300 such that the segment $R_f$ preferably has a number average molecular weight of 500 to 20,000, and Z is $-OC_aF_{2a+1}$ or Q.

Besides the inner layer compositions mentioned in U.S. Pat. No. 4,404,247, one may also use polymerizable phosphorylated monomers or oligomers which contain at least one aromatic cycloaliphatic or hetero atom moiety in a common organic solvent such as methyl ethyl ketone, an example of such a composition being phosphorylated dimethacrylate of hydroxypropoxylated bisphenol A.

The lubricant may be applied by a number of techniques including brushing, wire or knife coating, spraying, gravure coating, spin coating and dip coating. In spin coating, a solution of the coating material is applied to a spinning recording medium disk, and the solvent is then evaporated leaving a thin layer. When applying the perfluoropolyether lubricants described above, a magnetic recording medium comprising parts A, B and C as described above is coated first with primer solution, and, after being allowed to dry for a few seconds is coated in a solution of the perfluoropolyether. A typical concentration for the primer solution would be about 0.05 to 1.0 wt/vol %, and for the perfluoropolyether about 0.05 to 4.0 wt/vol % in a fluorinated solvent.

After the coated recording medium has dried, it would be exposed to ultraviolet radiation in a vacuum. Five to six minutes is a typical exposure time. During the photopolymerization, the system should remain oxygen free by maintaining a vacuum or an inert atmosphere. Photopolymerization initiators or sensitizors, (e.g. benzophenone or benzoin) may be incorporated into the lubricant compositions. Other methods may also be used to polymerize the perfluoropolyether lubricants such as electron beam curing. The thickness of the composite coating may be controlled by the proportion of solvent used to make the two solutions (primer and perfluoropolyether).

The invention will be further clarified by the following examples which are intended to be purely exemplary.

EXAMPLE I

A polyimide substrate disk having a thickness of about 0.05 mm. was placed on the anode substrate holder of a radio frequency diode sputtering system (Perkin Elmer Model 4400). The sputtering cathode target consisted of a CoCr alloy (83 atom percent Co and 17 atom percent Cr). The sputtering chamber was pumped down to a background pressure of about $1.5-1.7 \times 10^{-7}$ Torr. Argon gas was introduced at a flow rate of about 38.9 standard cubic centimeters per minute (scc/min.) at a pressure of about 6 millitorr. During sputtering, the substrate was rotated through an external drive means, and target power level was about 1100 watts while target potetial was about 1800 volts. Following about 87 minutes of sputter deposition of cobalt/chrome alloy on the substrate, oxygen gas was introduced into the sputtering apparatus at a flow rate of about 47.4 scc/min. and a pressure of about 6 millitorr. Sputtering was continued for about an additional three minutes with the target voltage maintained at about 1800 volts while target power level was raised to about 1250 watts. The resulting ferromagnetic thin film had a thickness of about 5000 angstroms.

X-ray photoelectron spectrometry (XPS) surface analysis was carried out on a portion of the ferromagnetic film (outermost 30 to 60 Å). XPS spectra were recorded at the surface of the sample and at discrete sampling depths after argon-ion beam sputtering. Results indicate that the surface comprises Co and Cr oxide with essentially none of either of the metallic species present. A depth profile indicated the cobalt oxide was about 100 angstroms thick having a sharp transition to cobalt metal beneath, with all the cobalt at a depth greater than about 150 angstroms being present as cobalt metal. The chromium oxide also evidenced a transition to predominantly chromium metal at about 100 angstroms depth into the recording medium. However, the transition region for chromium appeared less sharp than cobalt.

XPS surface analysis was further performed on a control film which was prepared as above but without the benefit of oxygen introduction during the final three minutes of deposition (both on fresh samples and samples aged at ambient conditions). Results indicate that the chromium is about 100% oxidized in both aged and unaged samples. The cobalt is about 45% cobalt metal and 55% cobalt oxide initially and 30% metal and 70% cobalt oxide following six weeks of aging.

The thin ferromagnetic film of this invention, having a nearly pure chromium oxide and cobalt oxide region extending at least 100 angstroms into the film was coated with a protective lubricant as follows:

A 0.15 wt/vol % primer solution was obtained and had been prepared by dissolving 150 grams of the phosphorylated dimethacrylate of hydroxypropoxylated bisphenol A in 100 ml. of common organic solvent such as methylethylketone. The dimethacrylate of hydroxypropoxylated bisphenol A is the reaction product of bisphenol A and glycidyl methacrylate, and its synthesis is taught in U.S. Pat. No. 3,066,112. It may be phosphorylated as follows:

Reagents 10.0 parts (by weight) Dimethacrylate of hydroxypropoxylated bisphenol A
1.6 parts (by weight) N,N-diethylamidodichlorophosphoric acid in 15.0 parts of dry benzene
1.7 parts (by weight) Triethylamine in 40 parts of dry benzene
40.0 parts (by weight) Dry Benzene The reaction mixture of the above ingredients is agitated for about 12 hours while at about 40° C., to yield the phosphorylated product. This is followed by removal of triethylamine hydrochloride by product via filtration. Benzene and other volitiles are removed from the filtrate under reduced pressure. The remaining residue is washed in benzene which is subsequently removed at, for example, 60°–65° and 20 mm. Hg. pressure, to give the viscous primer.

A perfluoropolyether solution was prepared by dissolving 0.1 gram of

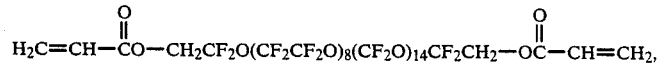

in 100 g. of a fluorinated solvent, (Fluorinert FC-77 solvent made by Minnesota Mining and Manufacturing Company.

The aforementioned thin film ferromagnetic medium was coated with the primer coating, dried, and was then coated with the perfluoropolyether solution and again allowed to dry. The coated recording medium was then subjected to ultraviolet radiation in a vacuum using an M-218 Double-sided Exposure System (Colight, Inc., Minneapolis, Minn.) using two 400 watt medium-pressure mercury lamps. This treatment polymerized the lubricant coating to yield a topcoat or lubricant having a thickness of about 7 to 30 nanometers.

EXAMPLE II

A thin cobalt chrome recording medium prepared as in Example I, except for the deletion of the lubricant, was spin coated with a myristic acid type lubricant solution and then dried, yielding a lubricant thickness of about one to 30 nanometers.

The recording media of this invention have been tested for durability using the following equipment and procedure. The media to be tested is radially stretched and adhered to a rigid circular frame to form a taut disc (a stretched surface recording medium). A YHS video ring head is used for reading and writing on the disk. This head is mounted on a counter-balanced arm similar to a phonograph tone arm arrangement. Good read/write performance has been found to result, without causing excessive media wear, when the head exerts a force of about 3.5 grams on the media.

The general test procedure consisted of the following steps:

1. A high density test of recording performance of the sample is conducted to establish a base line. In such a test, a single track is recorded on the medium at various recording densities increasing in steps from 0 to about 220,000 flux changes per inch (or 220 kfci). Output in decibels (dB) is measured at each recording density.

2. A track is written on the disk at a moderate density (30 kfci). The amplitude of the recorded signal is then measured periodically (every 30 seconds is typical) to determine if any significant loss of signal amplitude, which might indicate media wear, occurs. If such loss of signal amplitude is detected, the test is terminated. Otherwise, the test is stopped after a predetermined time interval.

3. Another high density recording test is performed and the results are compared to those obtained at the start of testing. If the sample lifetime has not been reached, Step 2 above may be repeated. The lifetime of the disk is defined as the interval required to 1) observe physical damage to the media and/or head upon visual (microscopic) examination, or 2) observe a change in the high density read/write performance greater than the approximately 5 dB variation commonly associated with the tests on otherwise good samples. Lifetime is recorded in terms of the number of passes the sample survives. It is sometimes recorded in minutes. The two values are related by the rotational speed of the media, which is generally about 75 inches per second (1.9 m/min.).

One must be careful in performing such tests to observe any accumulation of lubricant on the ring head. Such accumulation can cause spacing loss, a loss in signal strength due to the thickness of the accumulated lubricant on the head. Such a loss in signal is not due directly to damage or deterioration of the recording medium except for the loss of some lubricant. If the lubricant accumulation is wiped away from the head, the signal amplitude may increase. This invention is not specific to a particular lubricant but depends on the combination of the improved bonding layer with a lubricant. The object of these durability tests is to measure the durability of the ferromagnetic recording layer (B) which is affected by the other layers. Thus, signal loss due to lubricant accumulation may give a misleading impression of the value of the medium being tested.

Using polyimide substrates and the perfluoropolyether and primer lubricant system of Example I, durability tests have been performed on recording media of this invention and of control samples identical in all respects except for the absence of the bonding layer of part (C). The lifetimes of the control samples were generally very low. While there was considerable variation, lifetimes in excess of 30 minutes were uncommon. On the other hand, the lifetimes of the inventive media were greatly improved, being generally in the range of 3 to 10 hours with some samples still running after 10 hours. A comparison of two typical samples is shown in table 1 below.

TABLE 1

| | Observation |
|---|---|
| Inventive Medium | no signal amplitude loss after 20 min., test terminated |
| Control | 2 min life time, 30 dB drop in output signal amplitude |

Other embodiments of this invention will be apparent to those skilled in the art from a consideration of this specification or practice of the invention disclosed therein. Various omissions, modifications and changes to the principles described herein may be made by one skilled in the art without departing from the true scope and spirit of the invention which is indicated by the following claims:

What is claimed is:

1. A method of making a ferromagnetic recording medium comprising the steps of:
  (i) coating a non-magnetic substrate material with a magnetic layer comprising a cobalt/chromium alloy having an atomic ratio of cobalt to chromium between about 75/25 and 90/10 by sputtering said alloy onto said substrate;
  (ii) after sufficient thickness of the cobalt chromium alloy has been coated onto the substrate, introducing a gas selected from the group consisting of a hydrocarbon, nitrogen, ammonia, and oxygen into the sputtering process in order to deposit a layer of cobalt and chromium reaction products with such gas and operating the sputtering process under the following conditions:
    (a) film growth rate of at least 50 angstroms per minute;
    (b) conditions of sputtering set to fully react the cobalt and chromium being sputtered with the gas; and
    (c) final thickness of said layer of cobalt and chromium reaction products being between about 40 and 300 Angstroms;
  (iii) coating the layer of reaction products of cobalt and chromium with a lubricant useful for lubricating recording media.

2. A method of making a ferromagnetic recording medium comprising the steps of:

(i) coating a non-magnetic substrate material with a magnetic layer comprising a cobalt/chromium alloy having an atomic ratio of cobalt to chromium between about 75/25 and 90/10 by sputtering said alloy onto said substrate;

(ii) after sufficient thickness of the cobalt chromium alloy has been coated onto the substrate, introducing a gas selected from the group consisting of a hydrocarbon, nitrogen, ammonia, and oxygen into the sputtering process in order to deposit a layer of cobalt and chromium reaction products with such gas and operating the sputtering process under the following conditions:

(a) film growth rate of at least 50 angstroms per minute;

(b) conditions of sputtering set to fully react the cobalt and chromium being sputtered with the gas; and (c) final thickness of said layer of cobalt and chromium reaction products being between about 40 and 300 Angstroms;

(iii) coating the layer of reaction products of cobalt and chromium with a lubricant as follows:

coating the reaction product layer from step (ii) with a primer layer comprising a dilute solution of a polymerizable phosphorylated monomer or oligomer containing at least one aromatic, cycloaliphatic or hetero atom moiety, said solution being in a common organic solvent;

drying the first layer;

coating over the first layer a second dilute solution of perfluoropolyether monomer having the formula

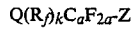
$Q(R_f)_k C_a F_{2a} - Z$ wherein Q comprises a polymerizable group attached to $R_f$, which represents a plurality of randomly distributed perfluroalkylene oxide repeating units which may be branched or straight chain structures represented by the formula $(C_a F_{2a} O)$ in which a of each unit is independently an integer of 1 to 4, k is the number of such units having a value of from 1 to 300 such that the segment $R_f$ has a number average molecular weight of 500 to 20,000, and Z is selected from $-OC_a F_{2a+1}$ and Q;

drying said perfluoropolyether; and polymerizing the dried primer and perfluoropolyether coatings.

3. A method of making a ferromagnetic recording medium comprising the steps of:

(i) sputtering a low coercive force magnetic material layer onto a non-magnetic substrate;

(ii) coating the low coercive force magnetic layer with a magnetic layer comprising a cobalt/chromium alloy, having an atomic ratio of cobalt to chromium between about 75/25 and 90/10 and coercive force at least 5 times that of the lower coercive force layer, by sputtering said alloy onto said low coercive force magnetic layer;

(iii) after sufficient thickness of the cobalt chromium alloy has been deposited, introducing a gas selected from the group consisting of a hydrocarbon, nitrogen, ammonia, and oxygen into the sputtering process in order to deposit a layer of cobalt and chromium reaction products with such gas and operating the sputtering process under the following conditions:

(a) film growth rate of at least 50 angstroms per minute;

(b) conditions of sputtering set to fully react the cobalt and chromium being sputtered with the gas; and (c) final thickness of said layer of cobalt and chromium reaction products being between about 40 and 300 Angstroms;

(iii) coating the layer of reaction products of cobalt and chromium with a lubricant useful for lubricating recording media.

* * * * *

UNITED STATES PATENT AND TRADEMARK OFFICE
CERTIFICATE OF CORRECTION

PATENT NO. : 4,803,130
DATED : February 7, 1989
INVENTOR(S) : Skorjanec and Thompson It is certified that error appears in the above-identified patent and that said Letters Patent is hereby corrected as shown below:

On the title page, under Inventors, "Carmen D. Moe" should be
--Carmen M. Thompson--

In the specification:

Column 2, line 35, "typ" should be --type--

Column 3, line 32, "erpendicular" should be --perpendicular--

Column 5, line 2, "$R_f$preferably" should be --$R_f$ preferably--

Column 7, line 25, "YHS" should be --VHS--

Signed and Sealed this

Fourth Day of July, 1989

*Attest:*

*Attesting Officer*

DONALD J. QUIGG

*Commissioner of Patents and Trademarks*